(12) United States Patent
Wilson

(10) Patent No.: US 8,700,344 B2
(45) Date of Patent: Apr. 15, 2014

(54) ULTRASONIC FLOW METER

(75) Inventor: Michael A. Wilson, Tallassee, AL (US)

(73) Assignee: Neptune Technology Group Inc., Tallassee, AL (US)

( * ) Notice: Subject to any disclaimer, the term of this patent is extended or adjusted under 35 U.S.C. 154(b) by 137 days.

(21) Appl. No.: 13/090,980

(22) Filed: Apr. 20, 2011

(65) Prior Publication Data

US 2012/0271568 A1 Oct. 25, 2012

(51) Int. Cl.
*G01F 1/66* (2006.01)

(52) U.S. Cl.
USPC .......................................................... 702/48

(58) Field of Classification Search
USPC .......................................................... 702/48
See application file for complete search history.

(56) References Cited

U.S. PATENT DOCUMENTS

| | | | |
|---|---|---|---|
| 4,052,896 A | | 10/1977 | Lee et al. |
| 4,452,090 A | * | 6/1984 | Kou et al. ................. 73/861.28 |
| 4,633,719 A | | 1/1987 | Vander Heyden |
| 4,882,934 A | | 11/1989 | Leffert et al. |
| 5,502,652 A | * | 3/1996 | Hoggatt et al. ............... 702/136 |
| 6,067,861 A | | 5/2000 | Shekarriz et al. |
| 6,158,288 A | | 12/2000 | Smith |
| 6,209,388 B1 | | 4/2001 | Letton et al. |
| 6,405,603 B1 | | 6/2002 | Baumoel |
| 6,732,575 B2 | | 5/2004 | Gysling et al. |
| 6,769,293 B2 | | 8/2004 | Zanker |
| 6,837,113 B1 | | 1/2005 | Freund, Jr. et al. |
| 6,950,768 B2 | | 9/2005 | Freund, Jr. et al. |
| 2003/0101804 A1 | | 6/2003 | Zanker |

FOREIGN PATENT DOCUMENTS

| | | |
|---|---|---|
| JP | 2008026213 | 2/2008 |
| JP | 2008122317 | 5/2008 |
| JP | 2008216100 | 9/2008 |

OTHER PUBLICATIONS

Genthe, W.K.; Yamamoto M., "A new ultrasonic flowmeter for flows in large conduits and open channels", Conference Article, publication date: 1974, pp. 947-955, vol. 1; Publisher: ISA, Published: Pittsburgh, PA.

* cited by examiner

*Primary Examiner* — Sujoy Kundu
*Assistant Examiner* — Ricky Ngon
(74) *Attorney, Agent, or Firm* — Paul M. Sykes; Bradley Arant Boult Cummings LLP

(57) ABSTRACT

A method and apparatus utilizing a pair of ultrasonic transducers simultaneously transmitting and receiving to measure the mean time of flight of an ultrasonic signal over a given distance, and thereby the speed of sound of a fluid in a conduit at a given temperature, independent of flow rate, and the flow rate of the fluid. A signal source simultaneously drives an upstream transducer and a downstream transducer, each of which receive the signal transmitted by the other. The difference between the upstream and downstream signals takes into account the speed of sound of the fluid. The time of flight for the upstream and downstream signals can then be used to calculate the flow rate. A phase locked loop coupled to the signal source automatically adjusts for variations of the speed of sound in the fluid in response to temperature changes.

15 Claims, 5 Drawing Sheets

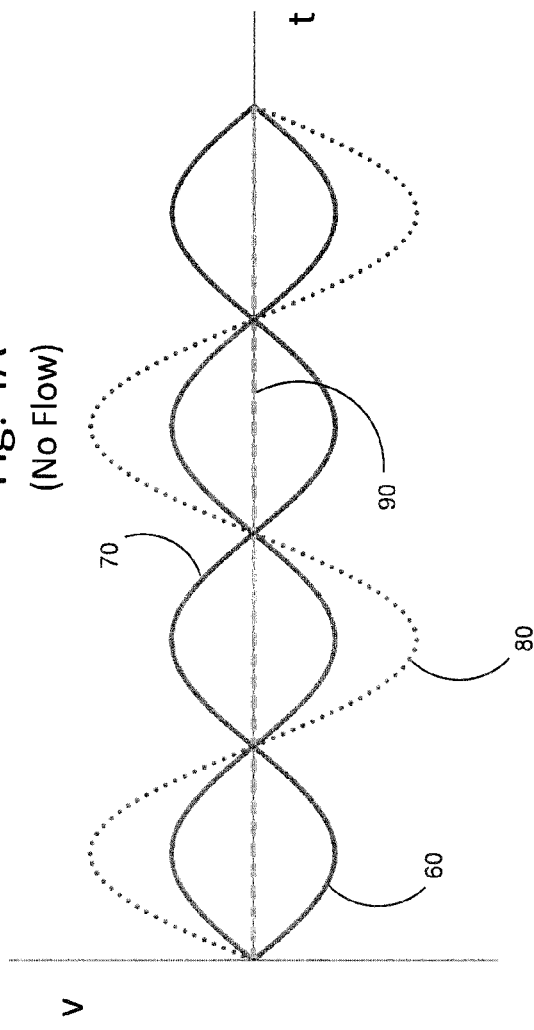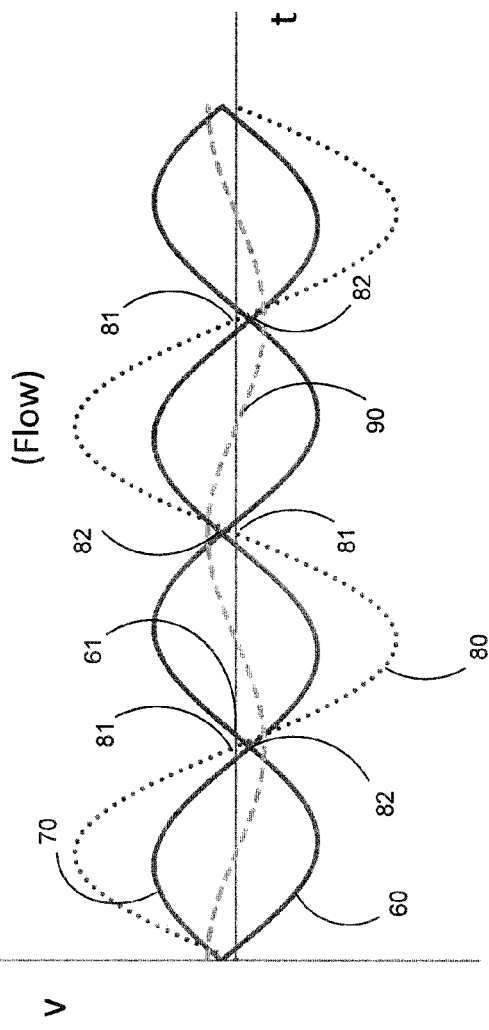

ULTRASONIC FLOW METER

TECHNICAL FIELD

The invention relates generally to the field of measurement instrumentation, to a method of transmitting and receiving signals simultaneously to measure a desired parameter, and in particular to metering devices to measure fluid flow.

BACKGROUND

Various mechanisms have been developed for use in meters to translate flow of a fluid, such as water or oil, to a measurable quantity. One such mechanism is an ultrasonic flow meter.

The typical prior art ultrasonic flow meter positions pairs of ultrasonic transducers on a segment of pipe or conduit, with one transducer located upstream and the other downstream with respect to the direction of fluid flow in the pipe. Each pair of ultrasonic transducers typically sends and receives an ultrasonic pulse, or series of ultrasonic pulses, back and forth. That is, the first transducer in the pair generates a pulse, or series of pulses, which is received by the other transducer. The time of flight of each pulse, or the average time of flight of the pulses in the series of pulses, is measured. The second ultrasonic transducer then sends a pulse, or series of pulses, to the first transducer. Again, the time of flight is measured. The fluid flow causes the pulses traveling downstream (i.e., with the fluid flow) to move faster, and those traveling upstream (i.e., against the fluid flow), to move slower, than the speed of sound in the static fluid. Thus, as is known in the art, the rate of flow can be determined based upon the difference in flight time between the pulses moving downstream and those moving upstream. Because the speed of sound in a fluid is dependent on the temperature of the fluid, accuracy of the meter can vary with temperature if the meter is not calibrated to temperature.

Prior art meters suffer from a number of disadvantages. The arrival time of each pulse must be detected with high accuracy, if the meter is to be accurate. This requires timing precision much smaller than the period of the ultrasonic signal if acceptable resolution is to be achieved, which causes the meters to be expensive. Also, it can be difficult to determine exactly what is the beginning of the pulse, as received by the receiving transducer. This requires high bandwidth as well, making the system susceptible to noise. Calibration to temperature may require static flow conditions to determine the speed of sound at a given temperature, and also may be based upon factory settings and conditions that are difficult to reproduce in the field.

Thus, there exists a need for a meter in which can automatically calibrate in response to temperature changes and operates in a relatively narrow band, allowing simplified electronics and increased resistance to noise. The present invention satisfies these needs by providing a method and apparatus including an ultrasonic meter with two transceivers that transmit and receive a continuous tone in a narrow band simultaneously, with continuous feedback allowing for automatic adjustment of the transmitted signal to accommodate temperature variations.

SUMMARY

Embodiments of the present invention satisfy these needs. One embodiment of the present invention is a method of measuring the mean time of flight of an ultrasonic signal through a fluid over a known distance at zero flow, independent of the actual flow rate of fluid present in the conduit, if any, in which a periodic input signal is driven through a first and second ultrasonic transducer simultaneously to generate a first and second transmitted ultrasonic signal, respectively. While driving said transducers with said input signal, the first transducer receives the second transmitted signal, and the second transducer receives the first transmitted signal. In one embodiment, the input signal is derived from the difference between the first transmitted signal and the second transmitted signal, and the frequency of the input signal is adjusted until an intersection of the first and second transmitted signals (when viewed graphically, in time) occurs at the first transducer and another intersection occurs at the second transducer. The mean time of flight is measured based upon the a parameter derived from the relationship between the first and second received signals and the distance between the transducers. In one embodiment, this parameter is the time between an integral number of intersections measured at one transducer. Preferably, the integral number of intersections corresponds to the number of half cycles of the difference signal between the transducers based on the adjusted frequency.

In another embodiment, the rate of fluid flow can be measured using the above signals. Specifically, the difference in time between zero crossings of the received first and second transmitted signals is measured, and this time difference is directly proportional to fluid flow through the pipe.

Another embodiment is an apparatus for measuring the flow of a fluid in a conduit. This apparatus includes a switching signal source having an input and an output signal, where this source generates an oscillating output that switches states in response to a change in state of the input signal. The output signal of the source drives a pair of ultrasonic transducers, such that each transducer simultaneously transmits an ultrasonic signal through the conduit in response to the output signal and, while transmitting, receives the ultrasonic signal transmitted by the other transducer. A signal that is the difference between said received signals is coupled to the input of the switching signal source. A circuit, such as a comparator, detects when the amplitude of the first received signal is a desired value, preferably zero. A second circuit, such as a comparator, detects when the amplitude of the second received signal is said desired value, preferably zero. A processor then computes the difference in time between points at which the first and second signals are at the desired value, and this difference is directly proportional to the rate of flow of fluid in said conduit. A third circuit can be employed for detecting zero crossings of the difference signal, such as a comparator for detecting when the first and second received signals are equal. The processor may be programmed to compute mean time of flight, the temperature of the fluid, and the speed of sound in the fluid based upon the distance between the transducers and the time between the zero crossings of the difference signal.

Another embodiment of the present invention compensates automatically for variations in temperature of the fluid, which affects the speed of sound in the fluid. In this embodiment, a phase locked loop locks onto the points at which the amplitudes of the first and second received signals are the desired value, for example, when they are equal to one another, which corresponds to a zero crossing of the difference signal. The phase locked loop then drives the input of said switching signal source in response to these zero crossings. Thus, the frequency of the signal source is adjusted to maintain zero crossings of the difference signal at the transducers. This allows the speed of sound in the fluid to be continuously calculated and updated, irrespective of rate of fluid flow, as temperature of the fluid varies in the conduit.

BRIEF DESCRIPTION OF THE DRAWINGS

The present invention will be explained, by way of example only, with reference to certain embodiments and the attached Figures, in which:

FIG. 4A illustrates, as voltage versus time measured over a fixed distance, a signal traveling upstream, a signal traveling downstream, in zero flow conditions, where one signal is inverted from the other, and signals that are representative of the mathematical sum and difference between the upstream and downstream signals;

FIG. 4B illustrates the signals of FIG. 4A in the presence of flow;

DETAILED DESCRIPTION

One embodiment of the present invention comprises an ultrasonic fluid meter in which two ultrasonic transducers, one positioned upstream and one positioned downstream, simultaneously transmit and receive a signal. Each transducer receives the signal transmitted by the other. The speed of sound in the fluid and the flow rate of the fluid can independently be determined based upon analysis of the received signals, as described in more detail below. It should be noted that while the exemplary embodiment below is described with respect to measuring the flow of water, the apparatus and method of the present invention can be applied to measure the flow of any fluid, including for example, water, oil, natural gas, or chemicals. Moreover, embodiments of the method of the present invention, in which measurements are made based upon a pair of transceivers simultaneously sending and receiving, is not limited to ultrasonic transducers and the measurement of fluid flow.

Figure 1:
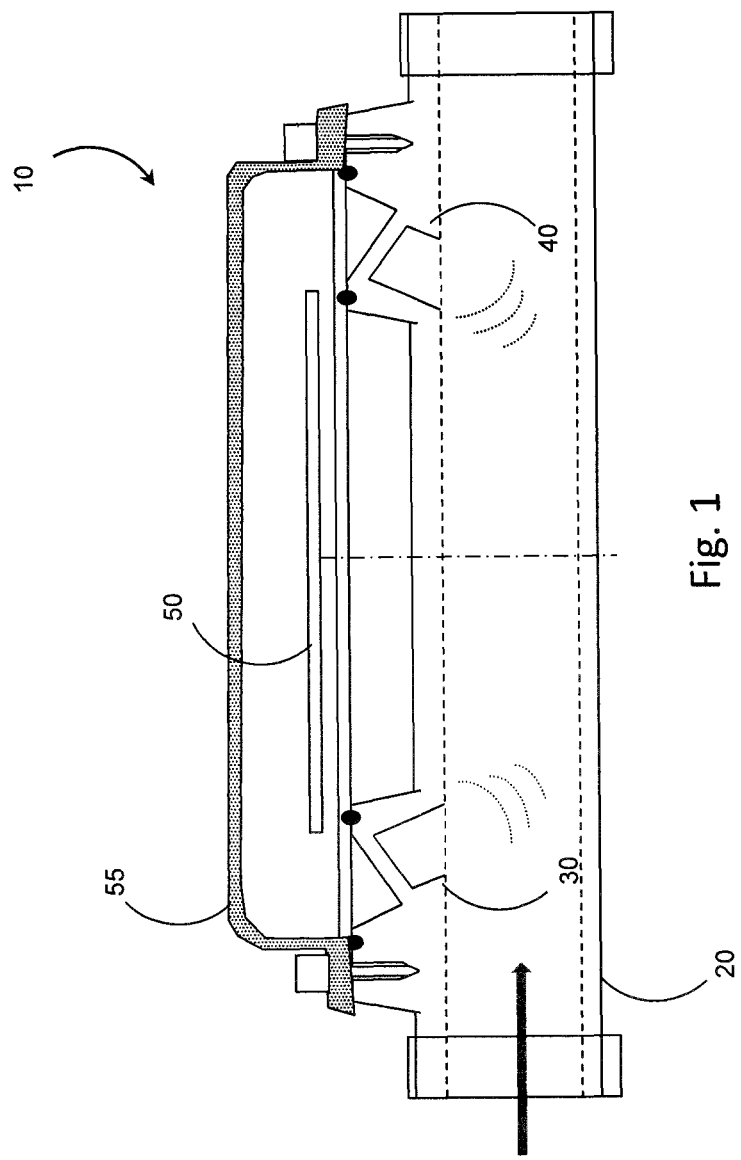
FIG. 1 is a sectional view of a representation of a meter comprising an embodiment of the present invention.
Figure 2:
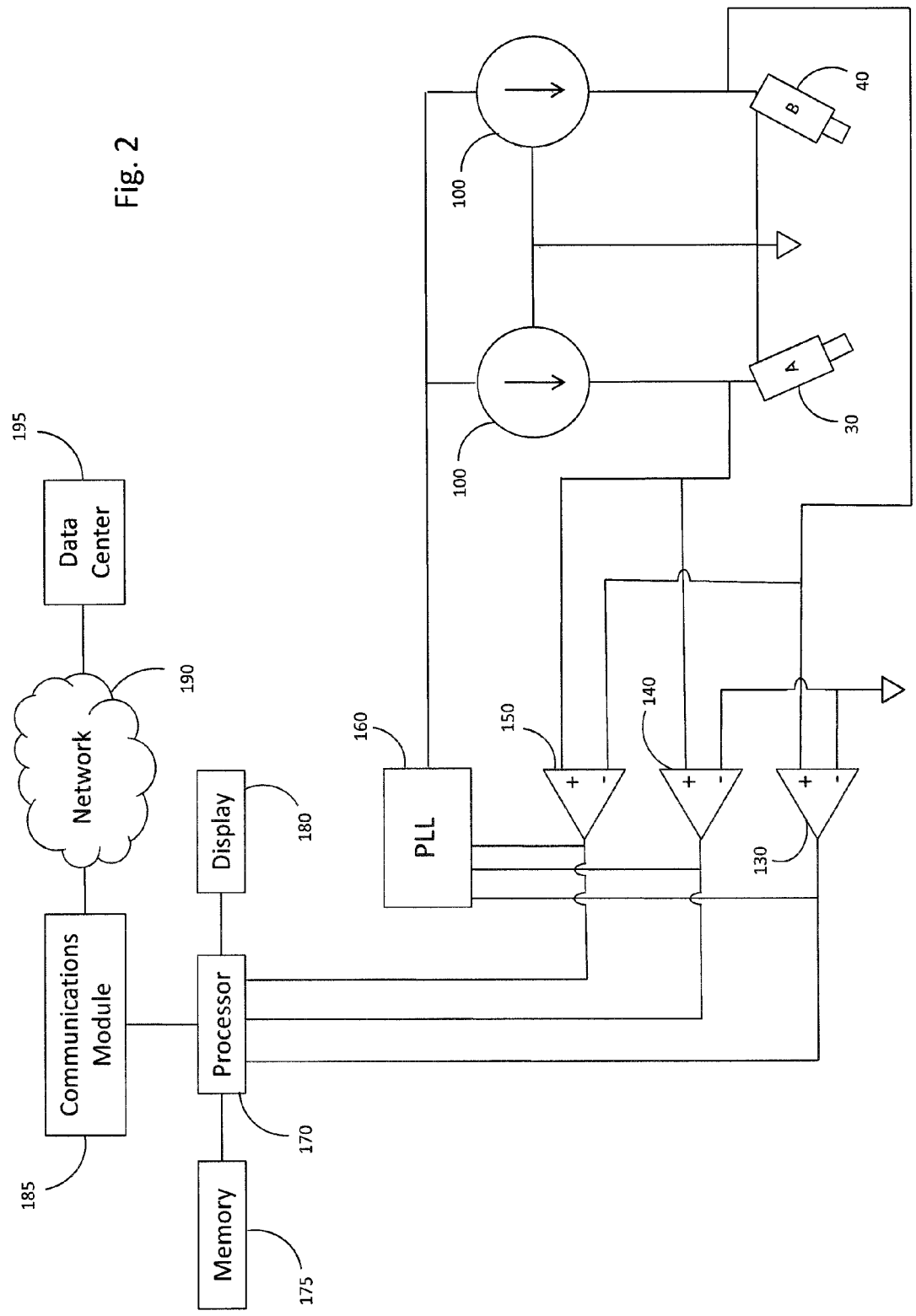
FIG. 2 is a block diagram of the embodiment of FIG. 1.

Referring to FIGS. 1-2, a meter 10 comprising an embodiment of the present invention is shown. The meter 10 includes a segment of a conduit 20 having a longitudinal axis, to which two ultrasonic transducers 30 and 40 are mounted. The operation of the meter 10 is not dependent on the direction of fluid flow, but for clarity and by way of example, an arrow in the conduit 20 represents the direction of fluid flow from left to right as shown in the FIG. 1. The transducers 30 and 40 are electrically coupled to a printed circuit board 50, which contains the electronics for driving the ultrasonic transducers, measuring the speed of sound in the fluid, and measuring the rate of fluid flow. The printed circuit board 50 and transducers 30 and 40 are mounted in a housing 55 secured to the outside of the conduit 20.

The ultrasonic transducers 30 and 40 may be standard, commercially available ultrasonic transducers. The transducer may act as a transmitter and receiver of an ultrasonic signal. When transmitting, the transducer receives an electrical signal as an input and converts it to a corresponding ultrasonic waveform. When receiving, the transducer receives an ultrasonic waveform and converts it to a corresponding electrical signal.

In the absence of flow (zero flow), an ultrasonic signal will travel at the speed of sound in that fluid, which varies by temperature. As is known in the art, an ultrasonic signal traveling upstream in a fluid, against the flow, moves slower than the speed of sound in that fluid, as the velocity of the signal is retarded by the flow. An ultrasonic signal traveling downstream, with the flow, moves faster than the speed of sound in the fluid, as the velocity of the signal is aided by the flow. Therefore, the time it takes for the signal to travel a given distance upstream is longer than the time it takes for the signal to travel the same distance downstream. These relationships are shown graphically in FIG. 3.

Figure 3:
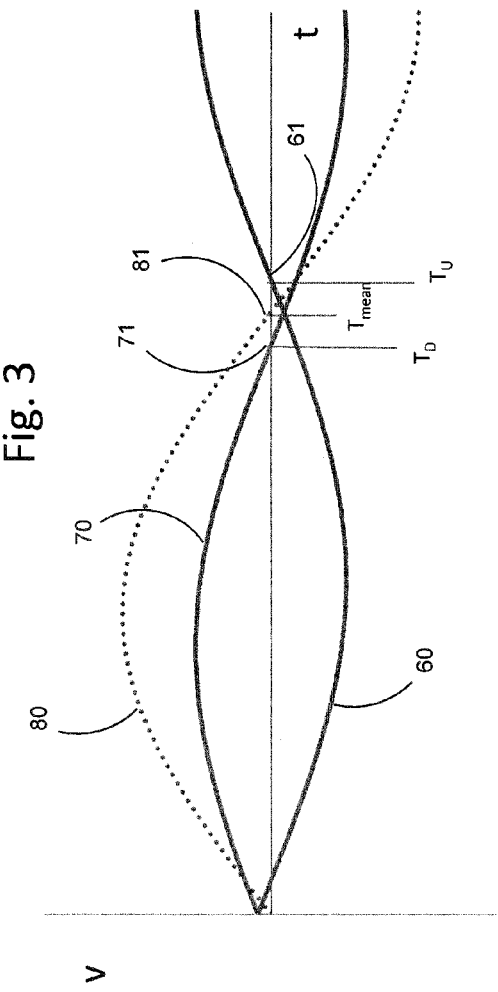
FIG. 3 is a graphical representation of signals traveling upstream and downstream in a fluid in a conduit, with flow present, and a signal representative of no flow conditions.

FIG. 3 illustrates the time of flight over a given distance of just over half a cycle of a signal traveling upstream 60, downstream 70, and in zero flow 80, where $T_U$ is time upstream, $T_D$ is time downstream, $T_0$ is time with zero flow. Their relationships to the velocity of sound and the velocity of the fluid flow can be expressed as follows, where x is the distance traveled, $V_S$ is velocity of sound in the fluid, and $V_W$ is the velocity of the fluid, for example, water.

$$V_S = \frac{x}{T_0},$$

such that $$T_0 = \frac{x}{V_S}$$

and $$T_U = \frac{x}{V_S - V_W}$$

$$T_D = \frac{x}{V_S + V_W}$$

In order to accurately compute the velocity of water, and from that the flow rate, the velocity of sound in the water at its actual temperature must be taken into account. Using the relationships set forth above, one can ascertain the speed of sound in water, $V_S$, as follows:

$$\frac{T_U + T_D}{x} = \frac{1}{V_S - V_W} + \frac{1}{V_S + V_W}, \text{ by definition} \quad \text{(Eq. 1)}$$

$$\frac{T_U + T_D}{x} = \frac{(V_S + V_W) + (V_S - V_W)}{V_S^2 - V_W^2}, \text{ by manipulation}$$

$$\frac{T_U + T_F}{x} = \frac{2V_S}{V_S^2 - V_W^2}, \text{ by collecting terms.}$$

By the same process:

$$\frac{T_U - T_D}{x} = \frac{1}{V_S - V_W} - \frac{1}{V_S + V_W}, \text{ by definition} \quad \text{(Eq. 2)}$$

$$\frac{T_U - T_D}{x} = \frac{(V_S + V_W) + (V_S - V_W)}{V_S^2 - V_W^2}, \text{ by manipulation}$$

-continued $$\frac{T_U - T_D}{x} = \frac{2V_W}{V_S^2 - V_W^2}, \text{ by collecting terms.}$$

If $V_s \gg V_w$, then the denominator of Eq. 2 is approximately equal to $V_s^2$. With respect to typical installations of embodiments of the present invention, $V_s$ will be approximately 1500 m/s and a typical maximum $V_w$ will be about 15 m/s, yielding a maximum error of about 0.01%. Hence the assumption of $V_s \gg V_w$ is valid. Using this approximation in Eq. 2:

$$\frac{T_U - T_D}{x} = \frac{2V_W}{V_S^2} \quad (\text{Eq. 3})$$

Solving for $V_w$:

$$V_W = \frac{V_S^2(T_U - T_D)}{2x}$$

By definition, $$V_S = \frac{x}{T_0}.$$

$T_0$ is the mean time of flight, and, as noted above, corresponds to the no-flow time of flight at the given temperature of the fluid. This value will be referred to henceforth as $T_{mean}$. Substituting $$\frac{x}{T_{mean}}$$

for $V_s$ in the equation above yields:

$$V_W = \frac{(T_U - T_D)\left(\frac{x}{T_{mean}}\right)^2}{2x}$$

which simplifies to the following:

$$V_W = \frac{x(T_U - T_D)}{2T_{mean}^2} \quad (\text{Eq. 4})$$

Figure 5:
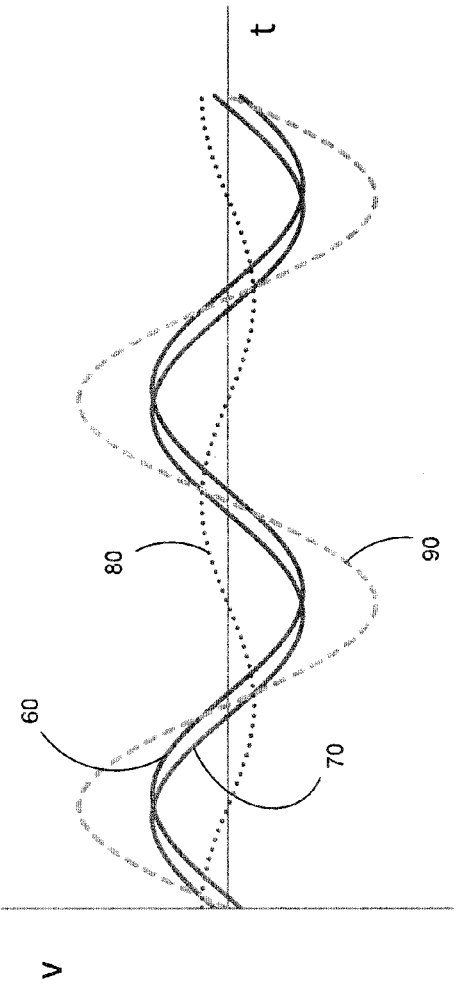
FIG. 5 illustrates the signals of FIG. 4B, where the upstream and downstream signals are not inverted from one another.

Embodiments of the method and apparatus of the present invention, in contrast to the prior art, provide a direct measurement of $T_{mean}$ and therefore of the speed of sound in water, independent of the rate of flow in water. FIGS. 4A-B show multiple cycles of the upstream and downstream signal waveforms, as well as the sum and difference of these signals, both without (FIG. 4A) and with (FIG. 4B) fluid flow. In a preferred embodiment, one signal is inverted from the other as shown in FIGS. 4A-B, which enhances the precision of the intersections of the signal, both for the viewer and for the electronics, which are discussed below. FIG. 5 illustrates these signals where the upstream signal 60 and downstream signal 70 are not inverted with respect to one another.

FIG. 4A illustrates, as voltage versus time measured over a fixed distance, the signal traveling upstream 60 (transmitted from the downstream transducer 30 and shown as received by the upstream transducer 40) and the signal traveling downstream 70 (transmitted from the upstream transducer 40 and shown as received by the downstream transducer 30) in zero flow conditions, where one signal is inverted from the other. As shown, the two signals propagate through the fluid at the same time, both traveling at the speed of sound in the fluid, with neither lagging nor leading, because there is no flow. FIG. 4A also illustrates a signal 80 that is the mathematical difference between signals 60 and 70, and a signal 90 that is the mathematical sum of signals 60 and 70. These will be referred to as the difference signal 80 and sum signal 90. Because signals 60 and 70 are inverted but otherwise have no phase difference under no flow conditions, the sum signal 90 in FIG. 4A is zero at all points and is coincident with the x axis.

FIG. 4B illustrates these signals in the presence of flow in the pipe. With flow, the upstream signal 60 takes longer to travel the distance between the transducers than the downstream signal 70. Also, because of the relative phase shift between the upstream and downstream signals, the sum signal 90 is present. The amplitude of the sum signal 90 is directly proportional to the phase shift between the signals 60 and 70, which in turn is directly proportional to the rate of fluid flow in the conduit. The amplitude of the sum signal 90, therefore, is directly proportional to the rate of fluid flow. It should be noted that the terms "sum" and "difference" are used herein with respect to the preferred embodiment, in which one transmitted signal is inverted from another. In a case in which the signals are not inverted from one another, or are offset by some desired phase angle other than 180 degrees, flow rate can be derived from the appropriate arithmetic combination of the signals.

As shown in FIGS. 4A-B, because the upstream signal 60 is phase offset negatively by the flow and the downstream signal 70 is phase offset positively by the flow, and they are nearly the same amplitude at any given flow, the difference signal 80 is substantially invariant with respect to flow. The difference signal 80 is therefore substantially the same in the FIG. 4A (no flow) and FIG. 4B (flow). Thus, in terms of timing and phase, the difference signal 80 is representative of the signal under no flow conditions, or $T_{mean}$, even when there is flow. $T_{mean}$ can be calculated based upon the timing of the cycles of the difference signal.

Specifically, $T_{mean}$ can be calculated by measuring the amount of time it takes for a given number of cycles (including fractional cycles) of the difference signal 80 to travel over a known distance. If the frequency of the difference signal 80 is known, and the distance is known, then one must simply measure the amount of time it takes for a given number of cycles to travel the known distance. This can be accomplished by selecting any desired point on the waveform as the starting point and counting cycles. To simply calculations, and in a preferred embodiment, it is desirable that there be an integral number of cycles, or half cycles, of the transmitted ultrasonic signal over the distance that the signal travels to the point at which it is measured. Here, because the ultrasonic signals are traveling between the transducers 30 and 40, that distance corresponds to the distance between the transducers. Therefore, the distance between the transducers is set to a desired value during design of the meter to provide an integral number of cycles or half cycles of the ultrasonic signal, based upon the intended center frequency of operation and the speed of sound in the fluid at a typical operating temperature. The intended center frequency of operation is selected based upon the resonant frequency and impedance of the ultrasonic transducer. The distance x between the transducers can be computed as follows, where c=the speed of sound in the fluid at a normal operating temperature, t is the time of flight of an ultrasonic signal between the transducers over the distance x under no flow conditions, N is the desired number of cycles, and f is the center operating frequency:

$$c = \frac{x}{t}$$
$$x = ct$$
$$t = \frac{N}{f}$$
$$x = c * \frac{N}{f}$$

With c equal to 1500 m/s (the speed of sound in water at room temperature), N chosen to be 15 cycles, and a center operating frequency f of 150 kHz, the distance x is calculated to be 15 cm.

If there is a known, integral number of cycles or half cycles of the sum signal over the distance between the transducers, any arbitrary point on the difference signal 80 could be used as a benchmark with which to count cycles over time. To further simplify measurement and calculations, in a preferred embodiment, cycles of the difference signal 80 can be identified and counted using zero crossings, that is, points 81 where the difference signal waveform 80 crosses the x axis on FIGS. 4A-B, or where the amplitude of the difference signal 80 is zero. The mean amplitude of the upstream and downstream signals is the amplitude of the difference signal divided by two. Therefore, the zero crossings 81 of the difference signal correspond to the zero crossings of the mean signal. For ease of measurement, therefore, $T_{mean}$, or the average time of flight between $T_U$ and $T_D$, can be calculated based upon the timing of the zero crossings 81 of the difference signal. As shown in FIGS. 4A-B, the zero crossings of the difference signal 80 correspond to the intersections 82 of the upstream 60 and downstream 70 waveforms, that is, where the amplitudes of those signals are equal. Further, as noted above, the interval between zero crossings 81 of the difference signal 80 is the same whether there is flow (FIG. 4B) or zero flow (FIG. 4A) in the conduit. Thus, $T_{mean}$ does not vary with flow rate. By using $T_{mean}$, one embodiment of the present invention provides a method of measurement of the speed of sound independent of the rate of flow of the fluid in the conduit.

FIG. 2 is a functional block diagram of one implementation of electronics used in the meter 10. A signal source 100 creates a signal to drive each of the ultrasonic transducers 30 and 40, which may be referred to as the upstream transducer 30 and downstream transducer 40. In a preferred embodiment, there is a separate signal source 100 for each ultrasonic transducer; these sources operate from the same triggering signal and thus are synchronized. The signal sources are preferably current sources and generate a periodic signal, such as a square wave. The output of the signal source 100, in this case an alternating periodic square wave, drives each transducer 30 and 40 simultaneously, causing each transducer to simultaneously transmit a corresponding ultrasonic signal. The input signals driving the transducers 30 and 40 may be offset in phase from one another by a desired amount, such as 180 degrees, and thus bear a known phase relationship with respect to one another. The ultrasonic transducers may be modeled electrically by an LC tank circuit, such that in response to an alternating periodic square wave current input, the ultrasonic transducer oscillates and transmits a tone that is sinusoidal in nature. Each transducer receives the signal transmitted by the other transducer. Therefore, each transducer is simultaneously transmitting and receiving. A method by which that is accomplished is described below.

Each transducer converts the ultrasonic signal received from the other transducer to a corresponding electrical signal. In the presence of flow, the signal traveling upstream 60 arrives slightly later than the signal traveling downstream 70, which appears as a phase shift between the signals. See FIGS. 3, 4B. Both received signals, that is, the signal 60 received by the upstream transducer 30 and the signal 70 received by the downstream transducer 40, are coupled to electronics to measure a parameter based upon the relationship between the signals, including the amplitude of an arithmetic combination of the received signals, or their phase relationship. In a preferred embodiment, where the transmitted signals are inverted from one another, the received signals 60 and 70 are coupled to a comparator 150, as shown in FIG. 2. This comparator 150 compares the signals to each other and identifies when the amplitudes of the two signals are equal, that is, graphically when they intersect. As discussed above, the intersections 82 of the upstream and downstream received signals 60 and 70 correspond to a zero crossings of the difference signal 80. The time between such intersections, or zero crossings, can be used to calculate the time of flight of the difference signal 80, which as explained above, corresponds to the signal under no flow conditions, or $T_{mean}$, even when there is flow. Thus, by measuring the time between a given number of zero crossings 81 of the difference signal 80, the speed of sound in the fluid, independent of rate of fluid flow, can be calculated. Because the speed of sound varies with temperature, accuracy of the meter is dependent upon this calculation.

This embodiment therefore measures $T_{mean}$ directly. Specifically, the value of $T_{mean}$ can be determined by simply measuring how long it takes for the number N cycles of the difference signal 80, as represented by the zero crossings 81 of that signal, to pass by each transducer. For example, if N was specified to be 15 cycles (based upon the distance between the transducers and the intended center frequency of operation, as described above), then a counter or processor 170 measures time between 30 zero crossings (there being two zero crossings in each full cycle). For greater accuracy, the processor may be programmed to measure the time between a large multiple of the number N cycles, and then to divide that time by the multiple. For example, using an N of 15 cycles, the processor may be programmed to measure the time between 3000 zero crossings, and then divide that time by 100 to arrive at $T_{mean}$.

With $T_{mean}$ having been measured and the distance x between the transducers being a known fixed value, the speed of sound in the fluid is easily calculated according to the simple equation:

$$V_S = \frac{x}{T_{mean}}$$

The velocity of sound $V_S$ in a fluid is a function of the temperature of the fluid. Once the velocity of sound in the fluid is measured, the temperature of the fluid can be calculated. In water, $V_S$=1404.3 m/s (at 0 C)+4 m/s per degree C. Hence, it is straightforward to calculate temperature of the fluid from the velocity of sound in that fluid. Accordingly, one embodiment of the present invention includes the use of ultrasonic transducers as described to function as a temperature meter. The temperature in turn allows the measurement of the flow of heat energy in the fluid to be determined and the calculation of secondary parameters such as viscosity. Those skilled in the art will recognize that further refinements and increased accuracy can be achieved by taking into account atmospheric pressure, according to well known mathematical and physical relationships.

Typically, the temperature of the fluid will vary over time, normally within a given range. As the temperature of the fluid varies, the speed of sound in the fluid varies. In a preferred embodiment, the operating frequency of the input signal is automatically adjusted as the temperature of the fluid affects the speed of sound in order to maintain the zero crossings of the difference signal at the location of the transducers such that there will continue to be an integral number of cycles or half cycles of the difference signal between the transducers. Thus, a meter using this embodiment automatically compensates for variations in the speed of sound with changes in temperature.

As shown in FIG. 2, in one embodiment, the calculations identified herein may be performed in a general purpose processor 170, having a memory 175 containing executable instructions to perform the calculation. The results of the calculations, including $T_{mean}$, the speed of sound in the fluid, the flow rate of the fluid, or the temperature of the fluid, may then communicated to a user via a display 180, or communicated to a network 190 and on to a host system or data center 195 via an output device or communications module 195, using hardware and methods known in the art.

In a preferred embodiment, each ultrasonic transducer 30 and 40 transmits and receives at the same time. This is accomplished by measuring the received signal at a time when there is little power being driven through the transmitter. As noted, and referring to FIG. 2, the comparator 150 outputs a square wave that changes in polarity when the difference signal equals zero. This signal is coupled to a phase locked loop 160, the output of which triggers the signal sources 100 and thereby locks their operating frequency onto the zero crossings of the difference of the received signals. This has two effects.

First, the phase locked loop 160 keeps the zero crossings of the difference signal 80 at the location of each transducer 30 and 40. This accomplishes the objective of having the signal sources 100 outputting near zero power, and therefore, not driving the ultrasonic transducers 30 and 40, near the time when the received signals are measured on the ultrasonic transducers 30 and 40.

Second, as changes in the temperature of the fluid cause the speed of sound to change and the time of flight of each ultrasonic signal to change, the phase locked loop 160 adjusts the operating frequency of the circuit to keep the zero crossings of the difference signal 70 located at each transducer. Because the location of the transducers is set to coincide with an even number of cycles or half cycles, there continues to be the same number of cycles or half cycles between the transducers even as temperature varies within the normal operating range of the meter. This also keeps the zero crossings 81 of the difference signal corresponding to the intersections 82 of the upstream and downstream signals.

The signal received by the upstream transducer 30 is coupled to a comparator 130, and the signal received by the downstream transducer 40 is coupled to a comparator 140. The comparators 130 and 140 compare the amplitude of their respective received signals against a desired reference value, which is used to determine the relative phase shift between the signals, which in turn is directly proportional to the rate of fluid flow in the conduit. In the embodiment where a periodic signal is used, the reference value is preferably chosen to be zero, such that the comparators determine the time at which the received signals cross zero, that is, their respective zero crossings. The comparators 130 and 140 output a square wave with edges defined by the zero crossings of their respective input signals. Reference values other than zero could be used and the design of electronics to detect and measure time intervals between such reference values is within the capability of those of ordinary skilled in the art.

Figure 6:
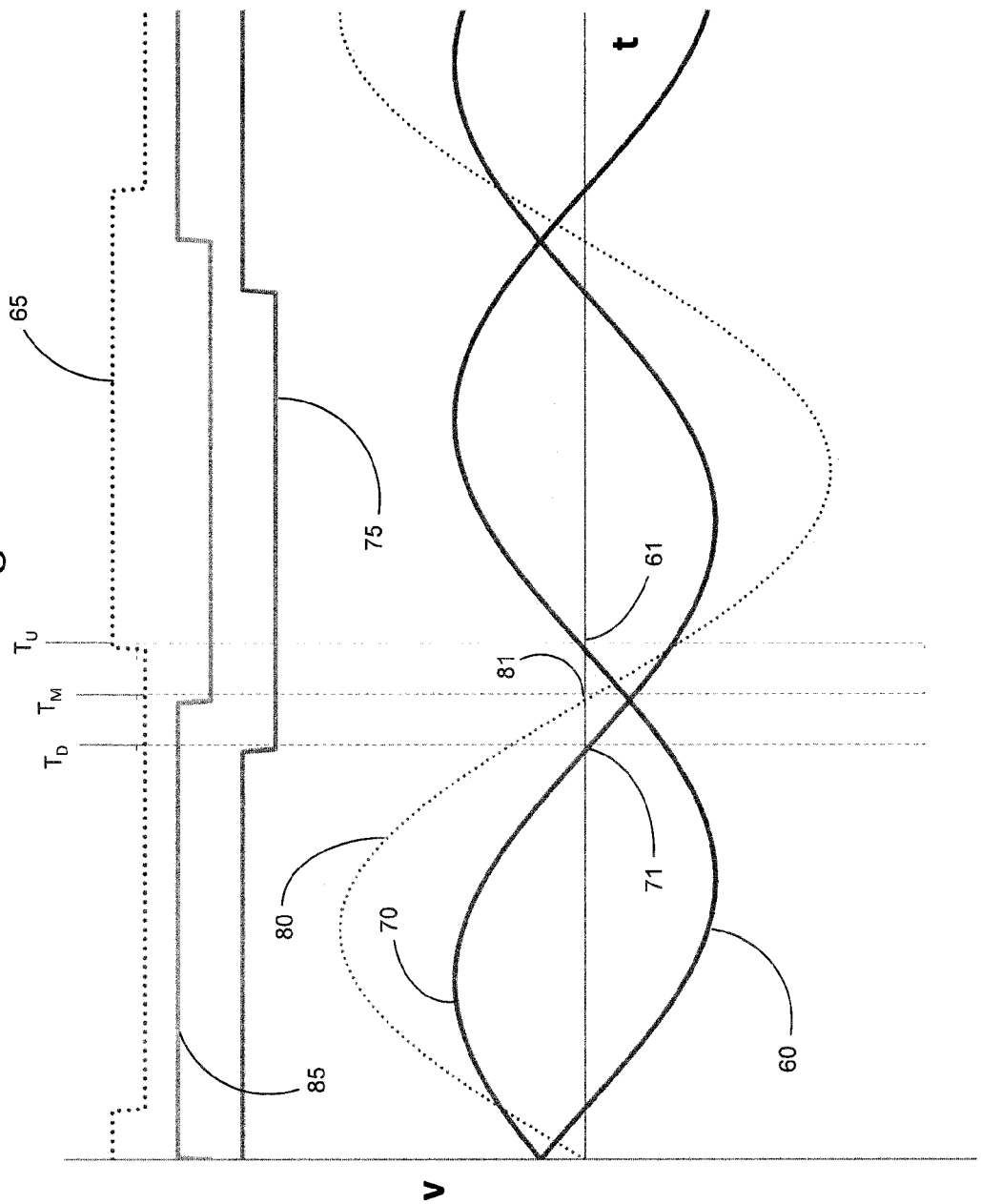
FIG. 6 illustrates the signals of FIG. 4B, with the output of the comparators of FIG. 2 superimposed, to illustrate the relationship between these various signals.

FIG. 6 illustrates the relationships of the zero crossings of upstream signal 60, downstream signal 70, and difference signal 80 to the output of the comparators 130, 140, and 150, in a preferred embodiment. Specifically, FIG. 6 shows as voltage versus time measured over a fixed distance, upstream signal 60, downstream signal 70, and the difference signal 80, in the presence of flow. Superimposed on the graph are cycles of the outputs of comparators 130, 140, and 150, shown as signals 65, 75, and 85, respectfully. Note that while the timing of the signals is as illustrated, their voltage has been offset for clarity. The downstream signal 70 travels the fastest and crosses the x axis first at point 71. As it crosses zero, the output signal 75 of the comparator 140 changes state, marking the zero crossing. $T_D$ may be calculated based on the time from the last transition to this one multiplied by the number of half cycles between the transducers 30 and 40. The upstream signal 60 travels the slowest and crosses the x axis at the point 61. As it crosses zero, the output signal 65 of the comparator 130 changes state, marking the zero crossing. $T_U$ may be calculated based on the time from the last transition to this one multiplied by the number of half cycles between the transducers 30 and 40. The difference signal 80 represents the mean of the upstream downstream signals, crossing zero at point 81 and generating an output signal 85 of comparator 150 as shown.

By counting and measuring the time between zero crossings of each signal, the values of $T_U$ and $T_D$ can be determined. Thus, the apparatus provides measurements of $T_{mean}$, $T_U$, and $T_D$, and the distance between the transducers x is a known fixed value. These values may be substituted into the equations above and both $V_s$ and $V_W$ are determined.

The dimensions of the conduit 20 in which the measurements are made, and through which the fluid flows, are known. The flow rate can then be calculated based on the following formula:

$$Q_{fluid} = V_W * A$$

where $Q_{fluid}$ is the flow rate, $V_w$ is the velocity of water, and A is the cross sectional area of the pipe.

Although the present invention has been described and shown with reference to certain preferred embodiments thereof, other embodiments are possible. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

What is claimed is:

1. A method of measuring a mean time of flight for an ultrasonic signal to travel a given distance in a fluid under zero flow conditions, independent of the rate of flow, if any, of said fluid during said measurement, comprising:

Driving a periodic input signal through first and second ultrasonic transducers simultaneously to generate first and second transmitted ultrasonic signals, respectively;

While driving said transducers with said input signal, receiving with said first transducer said second transmitted signal, and receiving with said second transducer said first transmitted signal, and measuring a phase relationship between said first received signal and said second received signal, said phase relationship defining a difference signal;

Computing said time of flight by dividing the distance between said transducers by the time elapsed between a selected number of cycles of said difference signal, said selected number of cycles corresponding to a frequency of said input signal and the distance between said transducers.

2. The method of claim 1, wherein said input signal is derived from said difference signal, and the frequency of said input signal is adjusted to maintain said selected number of cycles as the speed of sound in said fluid varies with changes in temperature of said fluid.

3. The method of claim 2, wherein the distance between said transducers corresponds to an integral number of half cycles of said difference signal.

4. The method of claim 2, where said input signal is offset in phase by a desired amount at said second transducer.

5. The method of claim 4, wherein said desired phase offset is 180 degrees.

6. A method of measuring a flow of fluid in a conduit comprising:

Driving an input signal through first and second ultrasonic transducers simultaneously to generate a first and second transmitted ultrasonic signal, respectively;

While driving said transducers with said input signal, receiving with said first transducer said second transmitted signal, and receiving with said second transducer said first transmitted signal;

Measuring a difference between said first and second received signals, said difference defining a difference signal and being directly proportional to fluid flow through said pipe, wherein said input signal is derived from said difference signal; and Adjusting a frequency of said input signal to maintain a selected number of cycles of said difference signal between said transducers, wherein the distance between said transducers corresponds to an integral number of half cycles of said difference signal.

7. The method of claim 6, wherein the frequency of the input signal is adjusted so that an intersection of the first and second transmitted signals occurs at the first transducer and another intersection occurs at the second transducer, an amplitude of the difference of said first and second signals being zero at said intersections.

8. The method of claim 7, further comprising accounting for a speed of sound through said fluid at an actual temperature of said fluid, independent of a flow rate, based upon the distance between said transducers and a time between a selected number of said intersections.

9. A method of measuring a mean time of flight for an ultrasonic signal to travel a given distance in a fluid under zero flow conditions, independent of a rate of flow, if any, of said fluid during said measurement, comprising:

Driving a periodic input signal through a first ultrasonic transducer to generate a first transmitted ultrasonic signal and receiving with a second transducer said first transmitted signal;

Driving said periodic input signal through said second ultrasonic transducer to generate a second transmitted ultrasonic signal and receiving with said first transducer said second transmitted signal;

Measuring a phase relationship between said first received signal and said second received signal, said phase relationship defining a difference signal;

Computing said time of flight by dividing the distance between said transducers by a time elapsed between a selected number of cycles of said difference signal, said selected number of cycles corresponding to a frequency of said input signal and the distance between said transducers.

10. The method of claim 9, wherein said input signal is derived from said difference signal, and the frequency of said input signal is adjusted to maintain said selected number of cycles as a speed of sound in said fluid varies with changes in a temperature of said fluid.

11. The method of claim 10, wherein the distance between said transducers corresponds to an integral number of half cycles of said difference signal.

12. The method of claim 10, where said input signal is offset in phase by a desired amount at said second transducer.

13. The method of claim 12, wherein said desired phase offset is 180 degrees.

14. The method of claim 10, further comprising computing the rate of flow of said fluid based upon said computed time of flight.

15. The method of claim 9, further comprising computing the rate of flow of said fluid based upon said computed time of flight.

* * * * *